US005624724A

United States Patent [19]

Relly

[11] Patent Number: 5,624,724

[45] Date of Patent: Apr. 29, 1997

[54] SELF RETAINABLE SHIM

[75] Inventor: Robert H. Relly, Richmond, Ind.

[73] Assignee: Shimmer, Inc., Waynesville, Ohio

[21] Appl. No.: 629,214

[22] Filed: Apr. 8, 1996

[51] Int. Cl.[6] .................................. B32B 3/02; B32B 3/06; B32B 3/30

[52] U.S. Cl. .................................. 428/43; 428/80; 428/167; 428/179

[58] Field of Search .................................. 428/43, 167, 83, 428/179, 80; 384/626; 188/196 V; 403/390

[56] References Cited

U.S. PATENT DOCUMENTS 4,232,068 11/1980 Hoh et al. .................................. 428/43

*Primary Examiner*—Alexander Thomas

*Attorney, Agent, or Firm*—R. William Graham

[57] ABSTRACT

A shim includes a generally u-shaped member having a pair of parallel legs interconnected by a base and at least one retainer finger extending from one of the legs generally toward the other leg in a manner to define a self-retaining surface area between the finger, the legs and the base.

16 Claims, 2 Drawing Sheets

SELF RETAINABLE SHIM

BACKGROUND OF THE INVENTION

1. Field of the Invention

The present invention relates generally to shims. More particularly, but not by way of limitation, the invention includes a generally U-shaped self retainable shim.

2. Related Art

There have long existed numerous types and designs of shims which are used to level or evenly space the positions of two or more pieces to be joined together. For example, there have been shims of various width and thickness to accommodate particular size and spacing of each area to be shimmed. Shims have been designed to also aid in fitting a particular space. Also, surface texture of shims have been modified to prevent slipping or movement between shims and/or surfaces of the piece to which the shim is disposed against.

While such shims have been helpful, there remains a need to provide an improved shim. For instance, many times in constructing a multistory building of prefabricated pieces, the pieces are not infrequently out of square or needing to be leveled. These pieces are typically interconnected by metal rods. U-shaped shims are disposed about the metal rods and between the pieces to effect a squaring or leveling of the pieces. However, moving the piece or pieces often require use of both hands and the U-shaped shim in many instances falls off the bar during the shimming process. When this occurs at above ground level, the shims are not usually retrieved until after the job, if at all, thus creating waste in time and shim material.

The present invention is aimed at solving this problem. The shim will be easy to use, reduce waste in loss of material and in time of installation. The shim will also accommodate shimming various size spacing.

BRIEF SUMMARY OF THE INVENTION

It is an object to improve shims.

It is another object to decrease the time and waste involved in a shimming process.

It is yet another object to maintain the versatility of a shim.

Accordingly, the present invention is directed to a shim including a generally u-shaped member having a pair of parallel legs interconnected by a base and at least one retainer finger extending from one of the legs generally toward the other leg in a manner to define a self-retaining surface area between the finger, the legs and the base.

Other objects and advantages will be readily apparent to those skilled in the art upon viewing the drawings and reading the detailed description hereafter.

DETAILED DESCRIPTION OF THE INVENTION

Figure 1:
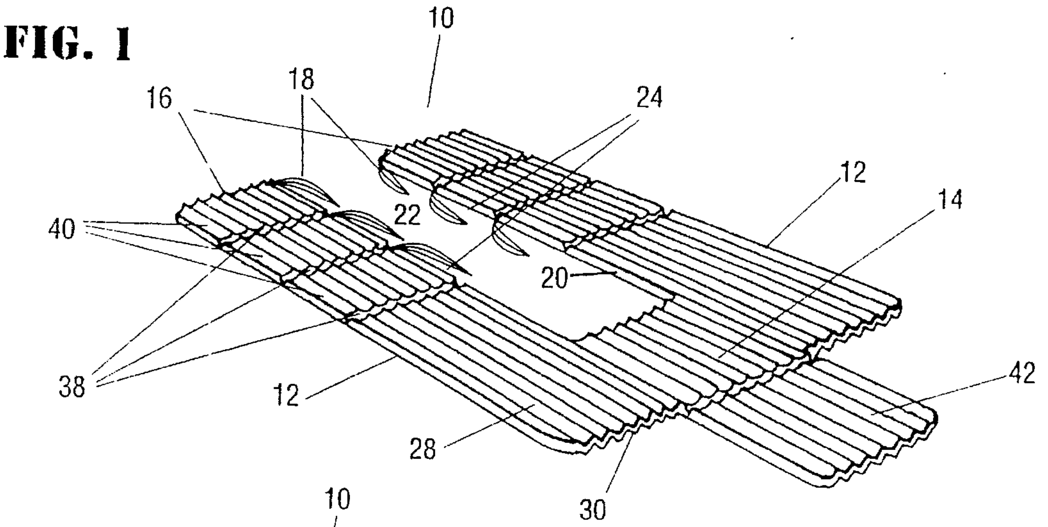
FIG. 1 is a perspective view of the shim of the present invention.
Figure 2:
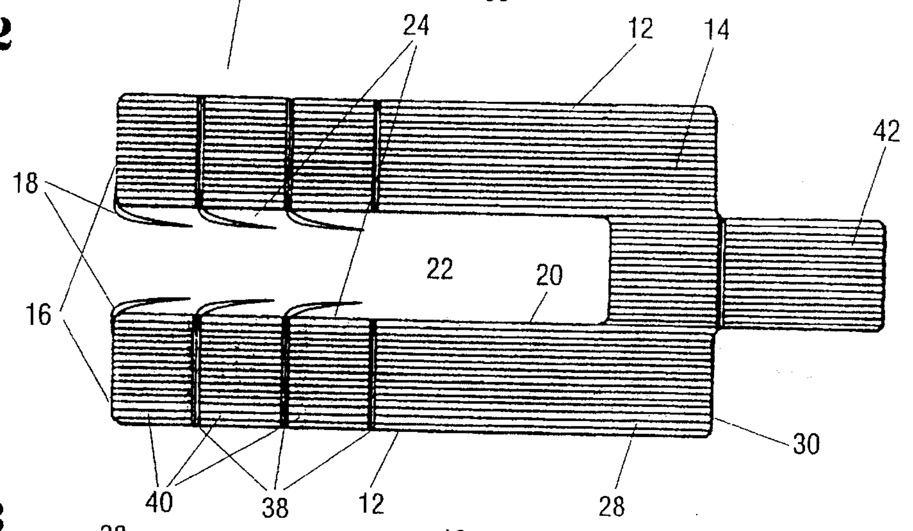
FIG. 2 is a plan view of the shim of FIG. 1.
Figure 3:
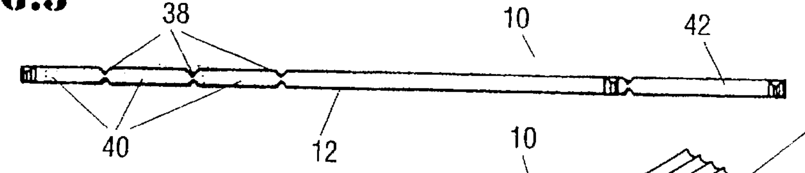
FIG. 3 is an edge elevational view of the shim of FIGS. 1 and 2.

Referring now to the drawings, a shim of the present invention is generally designated by the numeral 10 and is commonly made of a plastic material having high impact strength with some flexibility, such as styrene, but may be made of any suitable plastic or metal material to carry out the invention. The shim 10 can be of any desired thickness preferably of about one sixteenth inch thick.

The shim 10 is generally U-shaped having a pair of parallel legs 12 interconnected by a base 14. Each leg 12 has connected at its terminal end 16 a retainer finger 18 extending generally toward the other leg in a manner to define a self-retaining surface area 20 between the retainer fingers 18, the legs 12 and the base 14. The legs 12 can be of any desired length and width. Preferably ranging from 1 inch to 3 and ½ inch in length and ½ inch in width. The distanc between the legs 12 may be as desired, but for exemplary purposes herein, is preferably about ⅝ inch. Thus, the overall width of the shim 10 can be of any desired, but is preferably less than the width the pieces to be leveled joined for reasons apparent hereinafter.

The retainer fingers 18 are preferably integrally formed onto the legs 12. Each retainer finger 18 is angled backward into an open area 22 at approximately 45° from an edge 24 of each leg 12. The retainer fingers 18 are of a length such that the distance between them is less than a diameter of a connecting bar 26. The retainer fingers 18 are flexible enough such that they will bend to readily accommodate passage of the connecting bar 26 thereby and yet are of sufficient resilience to retain the connecting bar 26 from backing out of the shim 10 in a reverse manner without some significant external force being applied thereto. While there are presented multiple retainer fingers 18, it is contemplated that one retainer finger 18 with its length varied may suffice to accomplish the invention set forth herein. In addition, the length of the retainer finger 18 and the angle at which it is set is by way of example only and there may be a variety of length and angles for the retainer fingers which may be employed to carry out the invention. Rather than the fingers as shown in FIGS. 1, 2, 4 and 5, it could be that the edges 24 are formed with a protrusion of another geometric configuration to accomplish the purposes set forth herein. Accordingly, these variations are to be included as falling within the claims appended hereto.

Figure 4:
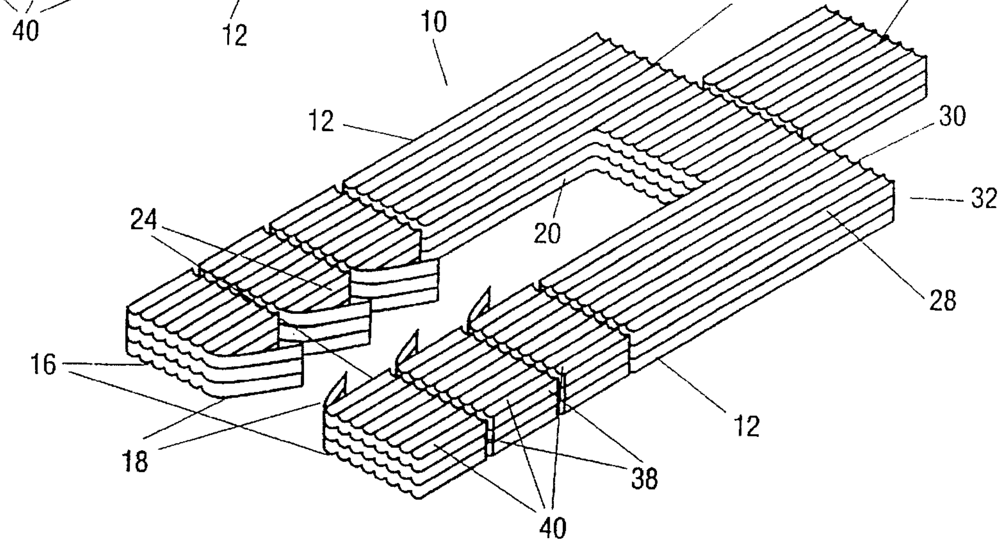
FIG. 4 is a perspective view illustrating a plurality of shims of the present invention in a stacked condition.
Figure 5:
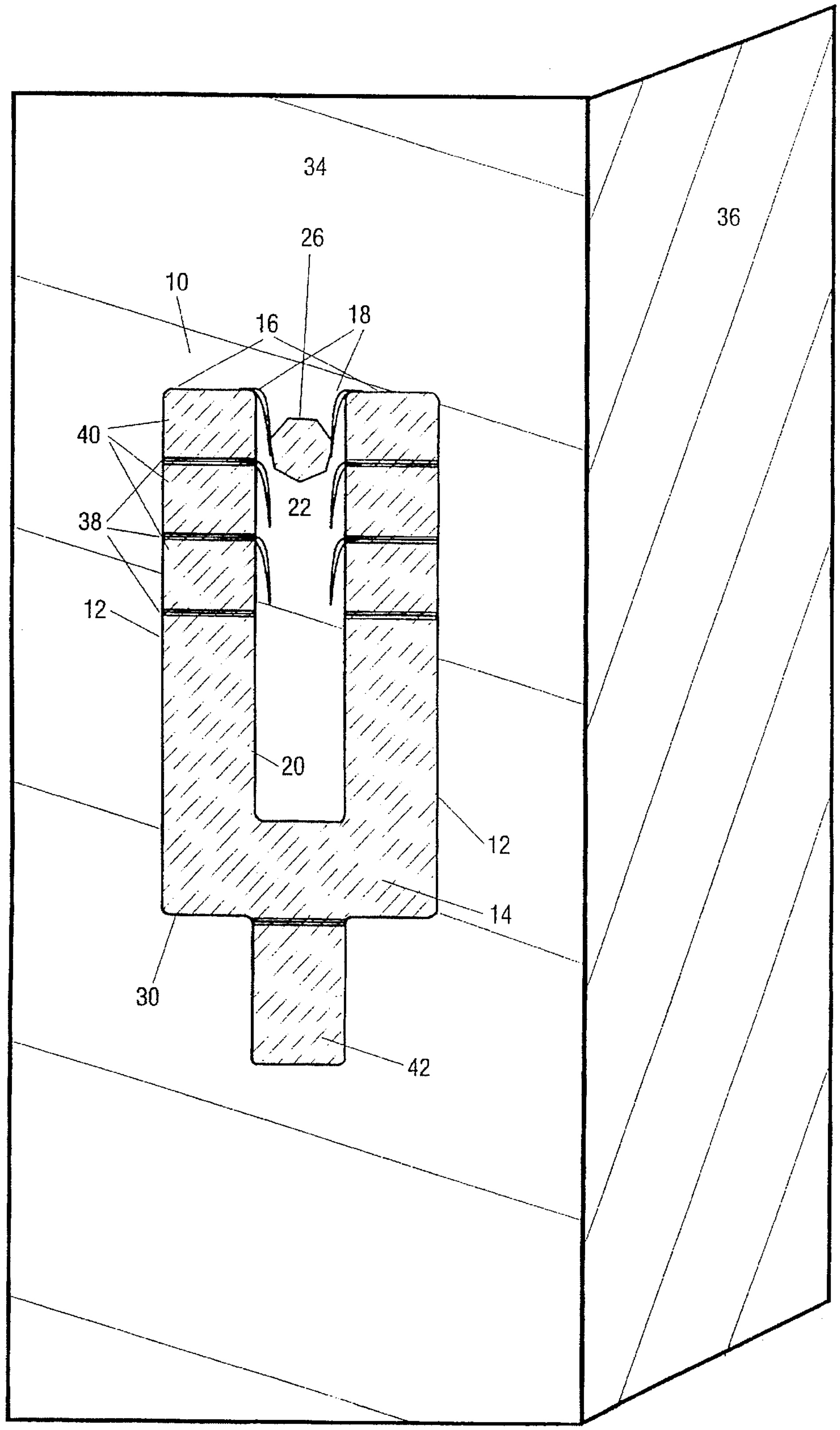
FIG. 5 is a cross sectional perspective view of the shim of the present invention disposed about a connecting bar and adjacent a piece to be leveled.

The surfaces of the shim 10 may be smooth or have striations 28 as shown in the FIGS. 1. 2 and 5. The striations 28 includes alternating grooves and ridges. Thus, when a plurality of shims 10 are disposed one on top of another as seen in FIG. 4 the striations 28 tend to prevent shifting or slipping between the shims 10. Heretofore, the shims 10 have been manufactured such that a common edge 30 of the shims 10 have been detachably joined by light welding or gluing to form a stack 32 of shims 10 of predetermined thickness such that one or more of the shims 10 can be broken off the stack 32 or added thereto to create a desired thickness.

The use of the shims 10 of the present inventions can greatly increase the ease of shimming. Here, the amount of thickness of the shims 10 to be inserted between two pieces 34 (only one shown in FIG. 5) is estimated and the amount of shims 10 is accordingly selected, as previously described. The shims 10 are forcibly disposed about the connecting bar 26 which joins the pieces 34 in a manner such that the connecting bar 26 bends the retainer fingers 18 to allow passage by of the connecting bar 26. After the connecting bar 26 is positioned within the self-retaining surface area 20, the shims 10 will either by gravity or through displacement be positioned to hang from the connecting bar 26 by the retainer fingers 18 such that the shims 10 do not extend beyond an outer surface 36 of the pieces 34.

It is common for the user to misgauge the number of shims 10 to be used in the shimming process and detach more shims 10 than necessary from the stack 32. In this case, rather than discarding the remainder of the stack 32, the present invention readily permits the replacement of one or more shims 10 to be positioned and self-retained in a like manner to the remainder of the stack 32 without fear that the shims will come off the connecting bar 26. Thus, waste is further prevented in this regard.

Optionally, the shim 10 may be provided with a plurality of transverse notched portions 38 within the legs 12. The notched portions 38 may be spaced along the legs 12 at any predetermined positions, preferably at ⅝ inch apart, thus creating segments 40 of approximately ½ inch. Each segment 40 includes retainer finger 18 which is formed in a similar manner as described above. The notched portions 38 define lines of weakness in the shim 10 such that any unnecessary end segment 40 may be broken off from the shim leaving behind a portion of the shim 10 which functions as previously described.

The shim 10 is optionally further provided with a handle 42 which is made by way of design an integral part of the shim 10 and connected to the base 14. The handle 42 serves as an aid to assist placement of the shim 10. Once the shim 10 is in place, the handle 42 may be removed if it so desired The above described embodiments are set forth by way of example and are not for the purpose of limiting the present invention. It will be readily apparent to those skilled in the art that obvious modifications and variations can be made to the embodiments without departing from the scope of the invention. Accordingly, the claims appended hereto should be read in their full scope including any such modifications and variations.

What is claimed is:

1. A self-retainable generally U-shaped shim, which includes:

a pair of parallel legs;

a base interconnecting said legs; and a first retainer finger extending from a first of said legs generally toward a second of said legs in a manner to define a self-retaining surface area between said finger, said legs and said base.

2. The shim of claim 1, which further includes a second retainer finger extending from said second leg generally toward said first leg in a manner to further define said self-retaining surface area to be between said retainer fingers, said legs and said base.

3. The shim of claim 1, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said outermost segment of said first leg generally toward said second leg in a manner to define a self-retaining surface area to be between said second retainer finger, said legs and said base.

4. The shim of claim 1, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said innermost segment of said second leg generally toward said first leg in a manner to define a self-retaining surface area to be between said second retainer finger, said legs and said base.

5. The shim of claim 1, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said outermost segment of said second leg generally toward said first leg in a manner to define a self-retaining surface area to be between said retainer fingers, said legs and said base.

6. The shim of claim 5, wherein each said first leg and said second leg includes a transverse notched portion dividingly forming an outermost segment of said leg and an innermost segment of said leg and weakening said leg at said notched portion to readily permit breaking thereat, which further includes a third retainer finger extending from said innermost segment of said first leg generally toward said second leg and includes a fourth retainer finger extending from said innermost segment of said second leg generally toward said first leg in a manner to define a self-retaining surface area to be between said second retainer finger, said legs and said base.

7. The shim of claim 1, which further includes a striated surface.

8. The shim of claim 1, which further includes a handle detachably connected to said base.

9. A stack of self-retainable generally U-shaped shims, which includes a plurality of shims wherein each said shim includes:

a pair of parallel legs;

a base interconnecting said legs; and a first retainer finger extending from a first of said legs generally toward a second of said legs in a manner to define a self-retaining surface area between said finger, said legs and said base.

10. The stack of shims of claim 9, wherein each said shim further includes a second retainer finger extending from said second leg generally toward said first leg in a manner to further define said self-retaining surface area to be between said retainer fingers, said legs and said base.

11. The stack of shims of claim 9, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said outermost segment of said first leg generally toward said second leg in a manner to define a self-retaining surface area to be between said second retainer finger, said legs and said base.

12. The stack of shims of claim 9, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said innermost segment of said second leg generally toward said first leg in a manner to define a self-retaining surface area to be between said second retainer finger, said legs and said base.

13. The stack of shims of claim 9, wherein each said first leg and said second leg includes a transverse notched portion dividingly forming an outermost segment of said leg and an innermost segment of said leg and weakening said leg at said notched portion to readily permit breaking thereat, wherein said first retainer finger extends from said outermost segment of said first leg and includes a second retainer finger extending from said outermost segment of said second leg generally toward said first leg in a manner to define a self-retaining surface area to be between said retainer fingers, said legs and said base.

14. The stack of shims of claim 13, wherein each said first leg and said second leg includes a transverse notched portion dividingly forming an outermost segment of said leg and an innermost segment of said leg and weakening said leg at said notched portion to readily permit breaking thereat, which further includes a third retainer finger extending from said innermost segment of said first leg generally toward said second leg and includes a fourth retainer finger extending from said innermost segment of said second leg generally toward said first leg in a manner to define a self-retaining surface area to be between said second retainer finger, said legs and said base.

15. The stack of shims of claim 9, wherein each said shim further includes a striated surface.

16. The stack of shims of claim 9, wherein each said shim further includes a handle detachably connected to said base.

* * * * *